[11] 3,586,265

| [72] | Inventor | Gero Otto Madelung |
| | | Munich, Germany |
| [21] | Appl. No. | 795,312 |
| [22] | Filed | Jan. 30, 1969 |
| [45] | Patented | June 22, 1971 |
| [73] | Assignee | Entwicklungsring Sud |
| | | GmbH, Munich, Germany |
| [32] | Priority | Feb. 28, 1968 |
| [33] | | Germany |
| [31] | | P 15 56 398.1 |

[54] PIVOT DRIVE FOR AN AIRCRAFT HAVING A VARIABLE GEOMETRY
4 Claims, 4 Drawing Figs.

[52] U.S. Cl. .................................................. 244/46
[51] Int. Cl. ................................................ B64c 3/40
[50] Field of Search ........................................ 244/46, 45, 47, 48, 49; 74/424.8, 89.15, 665

[56] References Cited
UNITED STATES PATENTS

| 2,744,698 | 5/1956 | Baynes ........................ | 244/90 (X) |
| 3,143,749 | 8/1964 | Buchholz ...................... | 74/424.8 (X) |
| 3,194,081 | 7/1965 | Parsons et al. ................ | 74/424.8 (X) |
| 3,229,545 | 1/1966 | Hautau ......................... | 74/424.8 |
| 3,279,721 | 10/1966 | Dethman ...................... | 244/46 |
| 3,405,891 | 10/1968 | Jacquart et al. .............. | 244/46 (X) |
| 3,469,806 | 9/1969 | Olchawa ....................... | 244/46 |

*Primary Examiner*—Milton Buchler
*Assistant Examiner*—C. A. Rutledge
*Attorney*—William K. Serp

ABSTRACT: A pivot drive for adjusting the sweepback of each of the wings of a jet aircraft in a simultaneous uniform manner. The base of each of the wings is pivotally mounted to a wing stub secured to each side of the aircraft fuselage. A pair of driving motors are mounted upon the wing stubs adjacent the sides of the fuselage and are drivingly coupled by means of a gear train to a drive shaft. The drive shaft passes through the fuselage. The ends of the drive shaft are coupled to a spindle gear by means of a cardan joint. The nuts of the spindle gear are pivotably connected to the base of the wing.

PATENTED JUN 22 1971 3,586,265

3,586,265

PIVOT DRIVE FOR AN AIRCRAFT HAVING A VARIABLE GEOMETRY

BACKGROUND OF THE INVENTION

This invention relates to a pivot drive apparatus for adjusting the wing sweepback of an aircraft having a variable geometry. In order to provide an extensive velocity range for an aircraft, that is a velocity range from very low to extremely high flight speeds, various means have been suggested for positioning the wings relative to the fuselage of the aircraft. In one such prior arrangement, the aircraft is provided with wings adapted to be rotated about a vertical axes so that in response to various flying conditions the geometry of the aircraft can be varied. In this respect, during very low flying speeds, the sweepback is adjusted to a minimum so as to increase the wing spread and the effective wing area thereby resulting in a minimum wing load. As a result of such an increase in effective wing area the lowest takeoff and landing speeds are possible. At sonic and supersonic flying speeds, the sweepback is increased and finally adjusted to a maximum so as to reduce the wing spread and the effective wing area thus increasing the wing load to a maximum so that the highest possible flying speed can be obtained.

With regard to the stability in flight and lateral directions, that is the stability related to the roll axis, it is of utmost importance that the adjustment of the wing sweepback is accomplished simultaneously and uniformly since the slightest difference in the sweepback angle of the two wings will produce a resultant force component which adversely affects the stability of the aircraft.

Presently known wing pivot drive arrangements suitable for adjustment of aircraft wing sweepback generally include a hydraulic servomotor. The motor provides a uniform swiveling of the wings about an axis normal to the plane of the wings. Such a motor is generally in a central position within the fuselage and usually is not free of random movement during wing adjustment. A still further disadvantage with such systems is that the central positioning of the driving motor within the fuselage interferes with the free accessibility of the motor for repairs and maintenance. Further, a comparatively large fuselage space is occupied by the motor which reduces the payload capacity of the aircraft.

It is a main object of the illustrated embodiment to provide a wing pivot drive apparatus which ensures a secure wing movement and affords a uniform and simultaneous adjustment of the sweepback of both wings of the aircraft during flight. The pivot drive is designed so that the components thereof are readily accessible and require only a small amount of available space within the fuselage. With respect to an additional feature of the illustrated embodiment, the pivot drive comprises a pair of motors which are controlled so that should one of the motors fail, a uniform and simultaneous adjustment of the sweepback of both wings is obtainable irrespective of flight conditions. This feature affords an added degree of safety.

According to the illustrated embodiment, a driving motor is mounted in each wing stub. The operation of each of the driving motors is synchronized by a drive shaft extending through the fuselage. This drive shaft is connected by means of cardan joints to respective spindle gears. The spindle nuts of each of the gears are pivotally secured to the wings of the aircraft with the axis of rotation of the nuts being along a line parallel to the axis of rotation of the wings. Alternatively, the drive shaft may also be connected to the driving motors by means of a pair of rolling disc gears wherein each with the rolling disc gears comprise spur gearing. The axes of the driving motors are oriented along a line parallel to the drive shaft. The driving motors may be in the form of piston motors or servomotors. As a result of the position of the motors adjacent the sidewalls of the fuselage or alternatively in the wing stubs, the motors, as well as the pivot drives, are readily accessible.

Various other features and advantages of this invention will become apparent through reference to the following description and accompanying drawing which shows an illustrative embodiment of this invention.

DESCRIPTION OF THE PREFERRED EMBODIMENT

Figure 1:
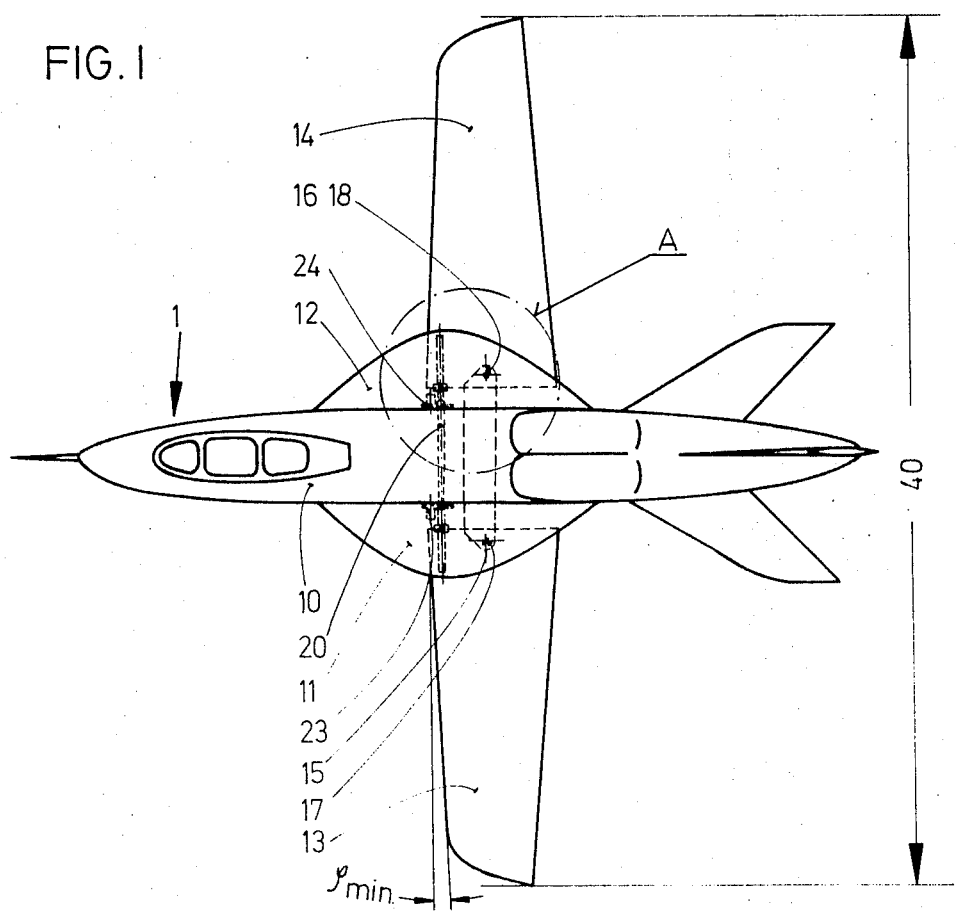
FIG. 1 is a top plane view of an aircraft including a pivot drive means illustrating certain features of the invention with the wings illustrated in their minimum sweepback position.
Figure 2:
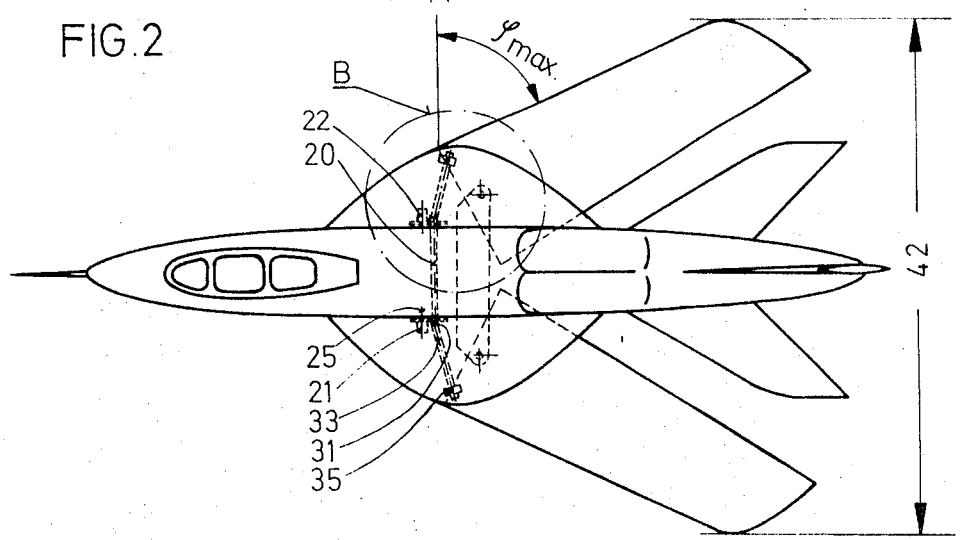
FIG. 2 is a top view of the aircraft of FIG. 1 with the wings illustrated being in their maximum sweepback position.
Figure 3:
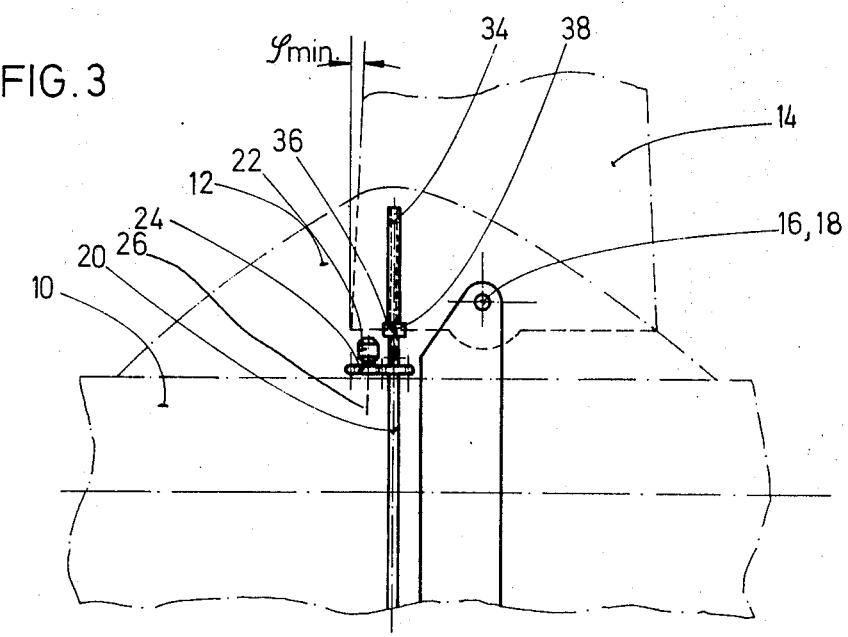
FIG. 3 is an enlarged fragmentary view of Detail A of FIG. 1.
Figure 4:
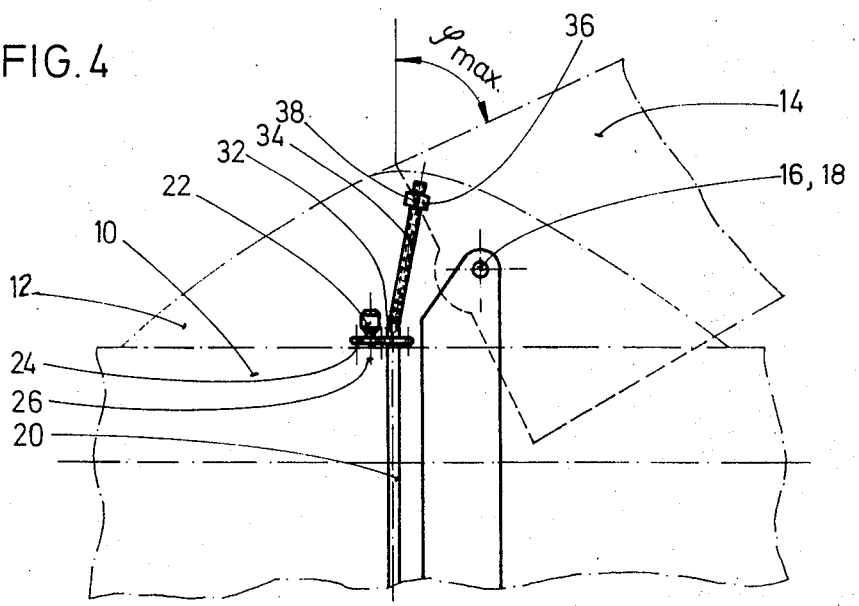
FIG. 4 is an enlarged fragmentary view of Detail B of FIG. 2.

The aircraft illustrated comprises a fuselage 10 to the sides of which wing stubs 11 and 12 are mounted. A pair of wings 13 and 14 are pivotally secured to the stubs by means of bearings 15 and 16 for rotation respectively about axes 17 and 18 normal to the plane of the wings. As a result of this construction the sweepback angle $\Phi$ and thus the maximum distance 40 and the minimum distance 42 of the wing spread can be varied.

Serving to control the sweepback angle are driving motors 21 and 22 which are mounted upon the wing stubs 11 and 12. Each of the motors are connected through a gear train 23 and 24 respectively to a drive shaft 20 so as to synchronize the operation of the motors and the adjustment of the wing sweepback angle. The shaft 20 in turn is connected through cardan joints 31 and 32 respectively to spindle gears 35 and 36 provided at the ends of threaded rods 33 and 34 respectively. The nuts 37 and 38 of each spindle gears 35 and 36 are rotatably mounted upon their associated wings 13 and 14 respectively with their axes of rotation being parallel with the axes of rotation 17 and 18 of the wings 13 and 14. Further, as illustrated, axes 25 and 26 of the driving motors are positioned parallel to the drive shaft 20.

In operation, actuation of the motors produces a corresponding rotational movement of the drive shaft 20 and the threaded rods 33 and 34. Rotational movement of the rods 33 and 34 cause the nuts 37 and 38 to advance therealong. Since the nuts are pivotably mounted to the wings 13 and 14, the wings in turn rotate about their axes 17 and 18 with respect to the fuselage 10 of the aircraft. In this manner, the sweepback angle $\Phi$ of the wing can be smoothly and uniformly adjusted.

Although a preferred embodiment of this invention has been described in detail, it is to be understood that various changes, substitutions and alterations can be made without departing from the spirit and scope of the invention.

I claim:

1. A pivot drive for adjusting the wing sweepback of an aircraft having a variable geometry wherein the wings are pivotally secured to wing stubs to permit rotation about an axis generally normal to the plane of the wing and wherein each of the stubs are securely mounted upon the fuselage of the aircraft, said pivot drive comprising a drive motor and drive shaft for each wing, a common drive shaft passing through the fuselage gear means drivingly connecting at each end to each of said drive motors, said drive motors being synchronized to drive said drive shaft in unison, a pair of spindle gears, each of which is coupled to one end of said drive shaft, spindle nuts on said spindle gears, said nuts being pivotally secured to the wings of the aircraft, and wherein the axis of rotation of said nuts is parallel to the axis of rotation of the wings.

2. A pivot drive in accordance with claim 1 which further includes a pair of cardan joints, each of which couples one of said spindle gears to one end of said drive shaft.

3. A pivot drive according to claim 2 wherein the rotational axis of each of the driving motors is positioned along a line parallel with the axis of the shaft.

4. A pivot drive according to claim 3 wherein each of said gear trains include a pair of disc gears.